(12) United States Patent
Penzes et al.

(10) Patent No.: US 8,079,008 B2
(45) Date of Patent: Dec. 13, 2011

(54) HIGH-SPEED LOW-LEAKAGE-POWER STANDARD CELL LIBRARY

(75) Inventors: Paul Penzes, Newport Beach, CA (US); Alvin Lin, Irvine, CA (US); Vafa James Rakshani, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 613 days.

(21) Appl. No.: 12/060,108

(22) Filed: Mar. 31, 2008

(65) Prior Publication Data

US 2009/0249259 A1 Oct. 1, 2009

(51) Int. Cl.
*G06F 17/50* (2006.01)
(52) U.S. Cl. .......... 716/122; 716/118; 716/119
(58) Field of Classification Search .......... 716/104, 716/110, 118–119, 122, 132, 135
See application file for complete search history.

(56) References Cited

U.S. PATENT DOCUMENTS

| | | | | |
|---|---|---|---|---|
| 5,724,251 A * | 3/1998 | Heavlin | ........... | 716/5 |
| 5,814,846 A * | 9/1998 | Essbaum et al. | ........... | 257/207 |
| 6,091,090 A * | 7/2000 | Gheewala | ........... | 257/211 |
| 6,446,240 B1 * | 9/2002 | Iyer et al. | ........... | 716/2 |
| 6,467,068 B1 * | 10/2002 | Iyer et al. | ........... | 716/6 |
| 6,789,232 B1 * | 9/2004 | Iyer et al. | ........... | 716/1 |
| 6,838,713 B1 * | 1/2005 | Gheewala et al. | ........... | 257/211 |
| 7,496,867 B2 * | 2/2009 | Turner et al. | ........... | 716/2 |
| 2002/0069396 A1 * | 6/2002 | Bhattacharya et al. | ........... | 716/7 |
| 2004/0143797 A1 * | 7/2004 | Nguyen et al. | ........... | 716/1 |
| 2005/0196685 A1 * | 9/2005 | Wang et al. | ........... | 430/5 |
| 2006/0064665 A1 * | 3/2006 | Zhang | ........... | 716/17 |
| 2006/0202231 A1 * | 9/2006 | Yamamoto | ........... | 257/207 |
| 2006/0289861 A1 * | 12/2006 | Correale, Jr. | ........... | 257/48 |
| 2008/0127000 A1 * | 5/2008 | Majumder et al. | ........... | 716/2 |
| 2008/0178135 A1 * | 7/2008 | Wu et al. | ........... | 716/8 |
| 2008/0244474 A1 * | 10/2008 | Turner et al. | ........... | 716/2 |
| 2009/0033368 A1 * | 2/2009 | Pitts | ........... | 326/101 |
| 2009/0114952 A1 * | 5/2009 | Correale, Jr. | ........... | 257/211 |

* cited by examiner

*Primary Examiner* — Stacy Whitmore
(74) *Attorney, Agent, or Firm* — Sterne, Kessler, Goldstein & Fox PLLC

(57) ABSTRACT

A high-speed, low leakage-power Standard Cell Library is provided. The high-speed, low-leakage-power Standard Cell Library provides the extra drive-strength of a taller X-Track library (e.g., 14-Track library) and low leakage-power comparable to that of a smaller, N-Track library (e.g., 10-Track library). The high-speed, low leakage-power Standard Cell Library includes a set of cells each having a device area designed to provide maximum drive strength for the cell. The high-speed, low leakage-power Standard Cell Library further includes a second set of cells having varying device areas that provide reduced leakage power characteristics comparable to cells in the smaller, N-Track library. The modified reduced leakage-power cells are formed by adding padding to the cell to achieve a desired leakage-power characteristic of the cell.

18 Claims, 5 Drawing Sheets

HIGH-SPEED LOW-LEAKAGE-POWER STANDARD CELL LIBRARY

FIELD OF THE INVENTION

The present invention relates generally to integrated circuit design and specifically to Standard Cell Libraries.

BACKGROUND OF THE INVENTION

Wireless devices such as phones and personal digital assistants (PDAs) have become essential business and personal tools. Users are requiring more and more functionality to be supported by these devices. At the same time, users are further demanding that these devices retain or improve their speed without putting any additional drain on their limited battery power. Designers of these devices are therefore faced with two contradictory design constraints. Circuits must operate at fast speeds to meet user expectations yet these same circuits must consume less power to allow for longer battery life.

In the past, technology scaling had provided the necessary speed increases. With the advent of technology scaling, higher and higher levels of integration became possible due to the shrinking device sizes. Technology scaling was providing not only an area scaling but also a delay scaling. According to Moore's "Law", chips were doubling their speed every 18 months. While this "law" has been applicable for more than 20 years, a point has been reached where process scaling no longer delivers the expected speed increases. This is mainly due to the fact certain device parameters have reached atomic scales. One of the consequences of this speed saturation due to technology scaling is that designers must work harder at each stage of the design flow to achieve the last remaining circuit performance. That is, even small speed/leakage-power improvements will come at significantly higher design efforts than in the past.

What is therefore needed are design tools, such as enhanced Standard Cell Libraries, that can produce circuits having optimal speed and leakage power performance.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
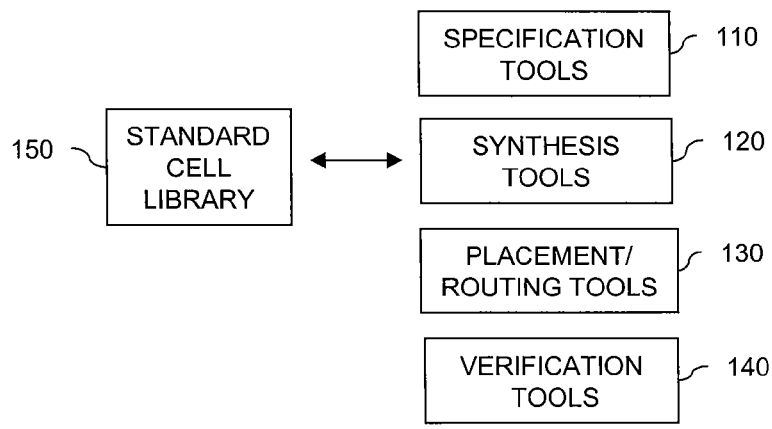
FIG. 1 depicts a high-level environment used in the design of integrated circuits, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 depicts a high-level environment 100 used in the design of integrated circuits, according to embodiments of the present invention. Design environment 100 includes specification tools 110, synthesis tools 120, placement/routing tools 130, and verification tools 140. During the design process, the functionality of the chip is specified in a specification tool 110 using a standard hardware programming language such as verilog. The resulting circuit description is synthesized/mapped into the basic gates of a standard cell library, such as Extended Standard Cell Library 150, using one or more synthesis tools 120 such as Synopsys' DesignCompiler, produced by Synopsys, Inc. of Mountain View, Calif. The resulting gate netlist is then placed and routed using placement/routing tools 130 such as Magma's BlastFusion, produced by Magma, Inc. of San Jose, Calif. Finally, the connectivity (LVS) and functionality of the integrated circuit are verified using a verification tool 140.

While each of these components is important for the final quality of the resulting integrated circuit, the quality of implementation achievable by most of these components is design dependent. For example, a good verilog code specifying circuit A, does not make an independent circuit B any better. However, an adequate Standard Cell Library makes all designs better. The quality of the Standard Cell Library influences all designs and as such has a far reaching influence on the quality of the resulting integrated circuit chip.

A Standard Cell Library includes hundreds of cells that can be selectively combined to design a larger circuit. Each cell in the library is associated with a specific logic function. Each logic function may be implemented in one or more predefined cells. For example, a logic function may have multiple layouts, each having different characteristics.

A cell in Standard Cell Library is laid out relative to a grid defined by horizontal and vertical tracks. The number of horizontal tracks defines the height of the cell and the number of vertical tracks defines the width of the cell. Cells in a Standard Cell Library have the same height (or integer multiple of that height). A Standard Cell Library is generally classified by its track height. For example, a 10-track library is composed of cells having heights of 10 tracks (or an integer multiple thereof). For ease of description, a smaller track library is referred to as an N-Track library and a larger track library is referred to as an X-Track library. The widths of cells in a library may vary. Because the heights of cells are consistent, cells of Standard Cell Library may be readily combined to create larger circuits.

The use of Extended Standard Cell Library 150 results in circuits having significant reduction in leakage power with no associated loss of speed. Extended Standard Cell Library 150 is composed of a base of cells from an existing X-Track Standard Cell Library. A set of modified X-Track, reduced power cells are added to these baseline cells to generate the Extended Library. The goal of Extended Standard Cell Library 150 is to provide an efficient library of cells that optimize speed and leakage power in integrated circuits synthesized using the library.

The type and number of cells added to the existing X-Track Standard Cell Library is dependent upon the efficiency required for the synthesis tool or application. Adding too many cells to a Standard Cell Library may significantly reduce the efficiency of the synthesis tool and the quality of the resulting integrated circuit. This is because the synthesis tool may have difficulty handling a large number of choices for a specific logic function. Accordingly, modified X-Track cells may only be provided for the most used logic functions. Commonly used functions include, but are not limited to, AND gates, NAND gates, inverters, OR gates, NOR gates, and flip flops. As would be appreciated by persons of skill in the art, as design tools become more sophisticated, Extended Standard Cell Library 150 can be further extended to include modified X-Track cells for a majority or all supported logic functions.

Each cell in Extended Standard Cell Library 150 is associated with a set of data characterizing the cell. Example data includes the drive strength (speed) and leakage power characteristics associated with the cell. A syntheses tool uses the data or a subset of the data to determine which cell to select for the required logic function. For example, for tasks which have extra timing margin, the design tool may select a cell having less drive strength (slower speed) but better leakage power characteristics. For tasks which have limited timing margin, the design tool may select a cell having greater drive strength (faster speed) and worse leakage power characteristics.

Figure 2:
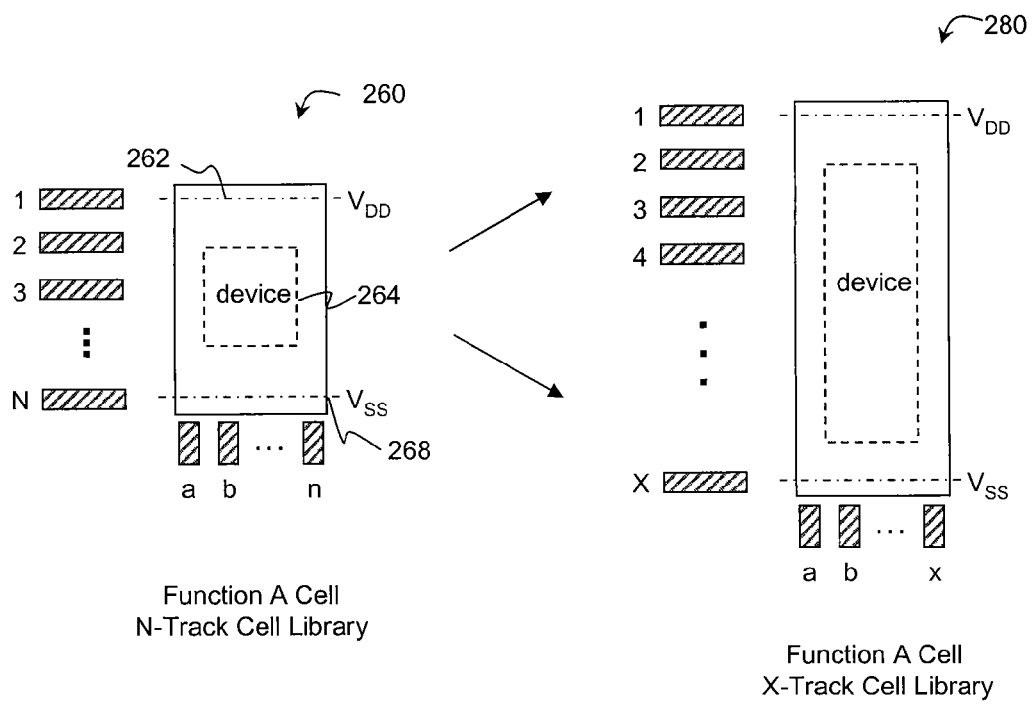
FIG. 2 depicts an exemplary cell from an N-Track Standard Cell Library (e.g., a 10-Track Library) and an exemplary cell for an X-Track Standard Cell Library (e.g., a 14-Track Library).

FIG. 2 depicts an exemplary cell 260 from an N-Track Standard Cell Library (e.g., a 10-Track Library) and an exemplary cell 280 for an X-Track Standard Cell Library (e.g., a 14-Track Library). Cell 260 has a height, N and a width, n. Cell 260 includes device(s) 264 which implement a logic function (e.g., logic function A) of the cell. For example, cell 260 may be an AND gate. Because cells must interface with other cells, a certain fixed clearance in the boundary of each cell must be maintained. The clearance of a cell includes the minimum distance between the device 264 and voltage rail 262 and between the device 264 and ground 268. The remaining area of the cell can be used to implement the logic function for the cell.

Exemplary cell 280 is a cell from a taller cell library (e.g., a 14-Track Library). In an embodiment, cells in a taller track library (14-Track) are created by stretching cells from a smaller track library (e.g., 10-Track) As height of a cell increases, the clearance required for a cell remains constant. That is, the clearance required for an N-Track cell is the same as the clearance required for an X-Track cell. For a taller cell, the ratio of clearance versus cell area becomes smaller. Therefore, a taller cell library allows for an increase in device area. The increase in device size/area in turn increases the drive strength of the resulting integrated circuits. Drive strength relates to the ability to drive the interconnect wires within a chip. When a cell increases in the size, the size of wires in the cell does not increase significantly. Therefore, wire delays can be leveraged more effectively in taller cells. This increase in drive strength in taller cells results in increased speed.

For example, a 14-Track library is capable of delivering about 20% more speed when compared to a design synthesized with a 10-Track library. The improvement in speed comes at the cost of increased leakage power. For example, the leakage power of a design synthesized using a 14-Track library increases about 62.5% as compared to the 10-Track library. Leakage is a result of current going through the gate of transistor in the device. As the size/area of devices increases, the leakage power increases proportionally. In battery-powered devices, such as cell phones, this leakage current can accumulate over time, even when the device is not in use, and deplete the battery.

Smaller cell 260 is slower than cell 280. However, because the gates in cell 260 are smaller, the gates have less current going through them. Therefore, these smaller gates have less leakage power. The use of taller cells present a design dilemma. The cells provide extra speed but at the cost of increased leakage power. Further, because of height incompatibilities, cells in taller libraries cannot be combined with cells from smaller libraries to gain the benefits of their reduced leakage power.

Extended Standard Cell Library 150 provides the extra drive-strength of the taller X-Track library and low leakage-power comparable to that of the smaller, N-Track library. Extended Standard Cell Library 150 is a modified X-Track Library. That is, Extended Standard Cell Library 150 combines a set of cells from an existing X-Track Library with a set of modified X-Track cells. The use of these modified X-Track cells results in a significant leakage-power reduction. In general, the resulting leakage-power reduction is comparable to that of the smaller N-Track library. At high speeds, the resulting leakage-power is even lower than that of the smaller N-Track library. Furthermore, the leakage-power reduction incurs no speed penalty.

Figure 3:
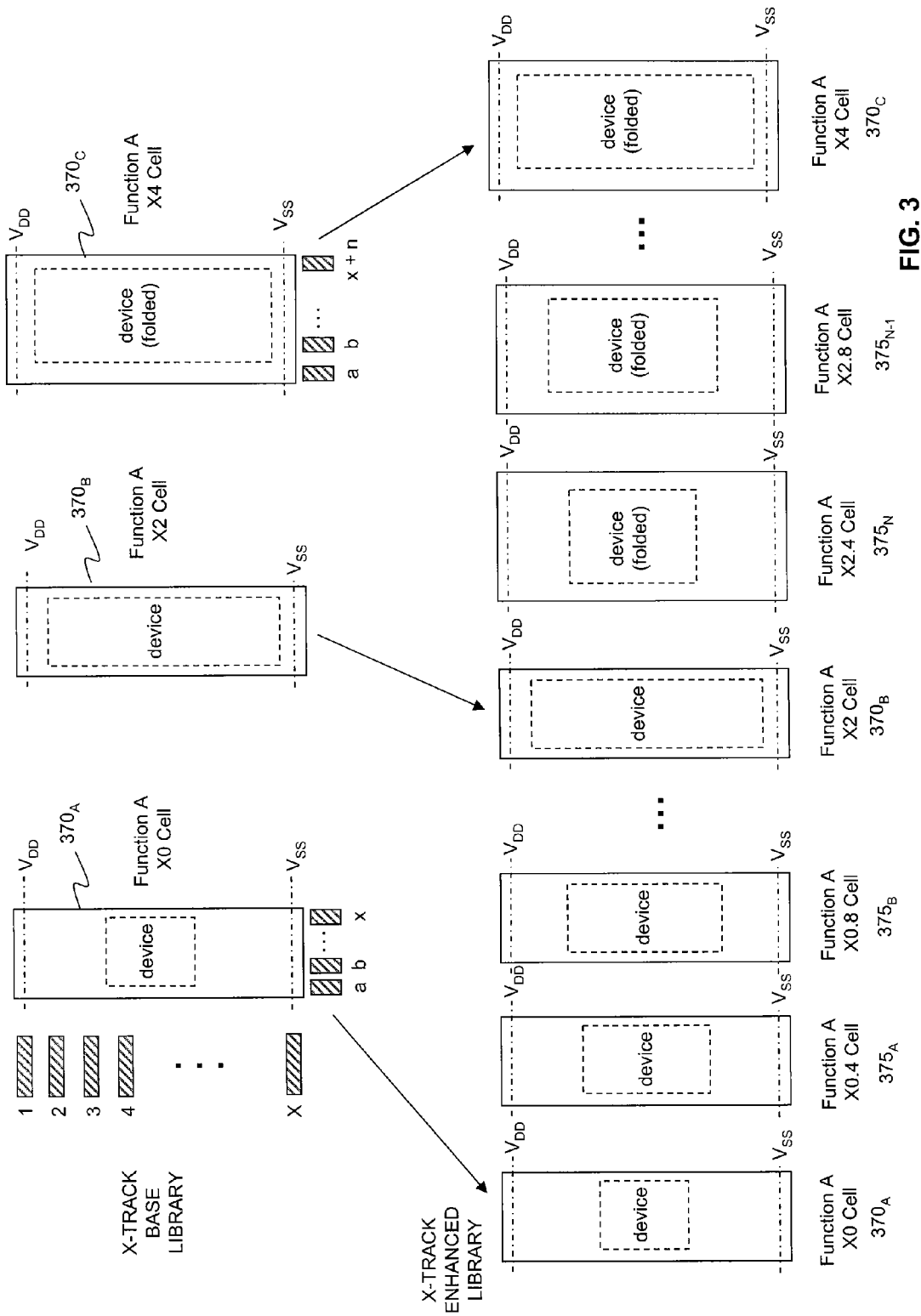
FIG. 3 depicts the exemplary contents of an extended X-Track Standard Cell Library for a specific function, A, according to embodiments of the present invention.

FIG. 3 depicts the exemplary contents of an extended X-Track Standard Cell Library for a specific logic function, A, according to embodiments of the present invention. The top row of FIG. 3 depicts the contents of an existing X-Track Standard Cell Library for function A. Existing X-Track library includes three cell layouts for function A. Cell $370_A$ (also referred to as the X0 cell) is usually a cell with minimum device sizes. Cell $370_B$ (also referred to as the X2 cell) has its devices extending the full cell template. Cells $370_A$ and $370_B$ have the same area. Cell $370_C$ (also referred to as the X4 cell) is a folded X2 cell (i.e., a cell that has all its transistors doubled up). In typical syntheses, the highest cell utilization happens around the X2 drive strength cells depending on the needs of an application and/or the constraints of a design tool.

The bottom row depicts the content of an extended Standard Cell Library for function A. Extended Standard Cell Library includes cells $370_A$, $370_B$, and $370_C$ from the existing X-Track library as well as modified reduced leakage cells $375_A$ through $375_N$. Any number of modified X-Track cells can be added for a particular logic function.

Each modified X-Track cell includes a different amount of padding and therefore a different device size. As depicted in FIG. 3, the amount of padding between the voltage rail and device(s) and ground and device(s) is varied for each added X-Track cell. Accordingly, each modified cell has different drive strength and leakage power characteristics. For example, in FIG. 3, the amount of padding is progressively reduced in cells added between Cell $370_A$ and Cell $370_B$. Providing this variety of cells for common logic function provides increased flexibility for the synthesis tool during the design of integrated circuits and allows for the generation of circuits with better speed-leakage power performance.

Figure 4:
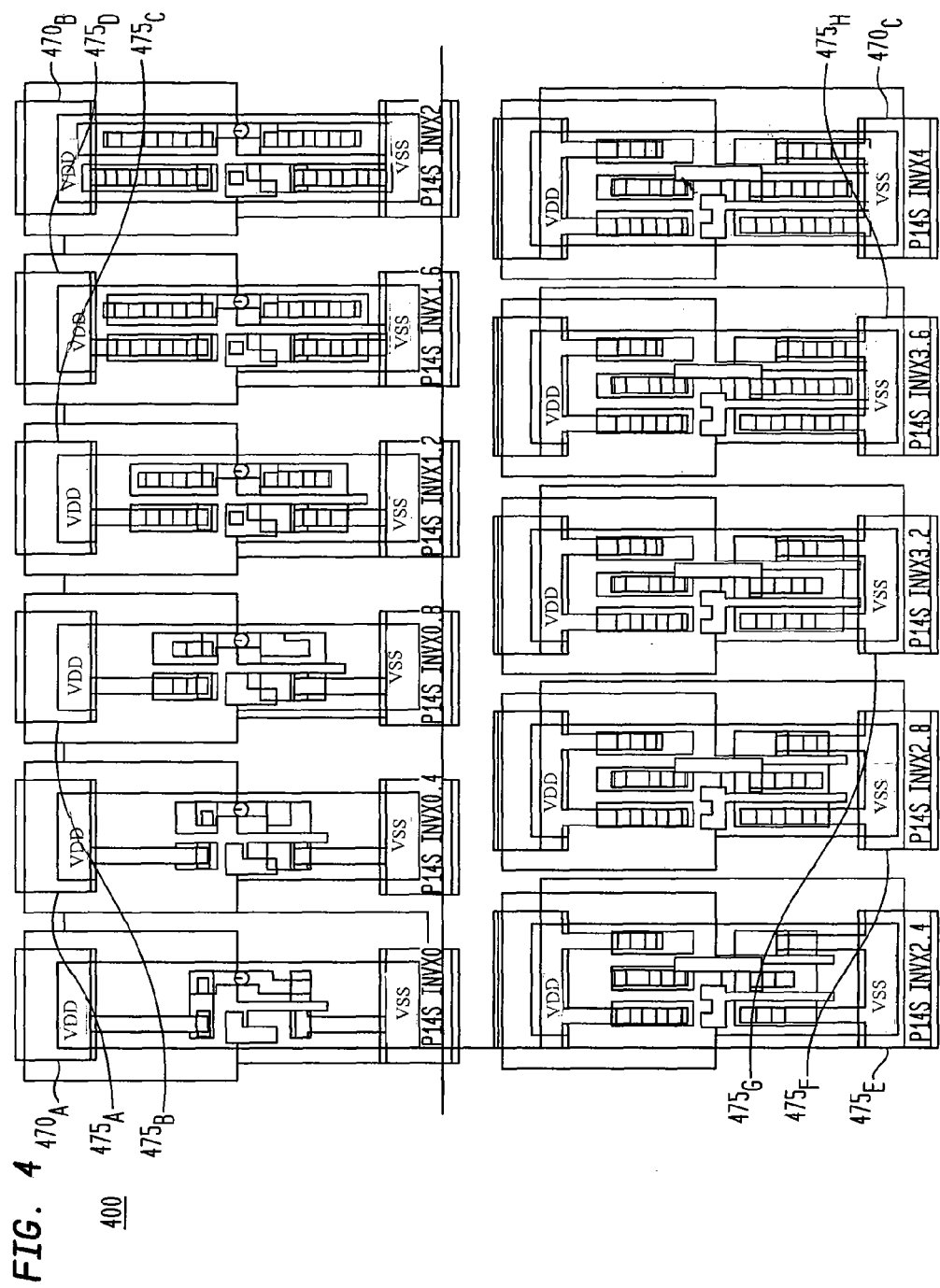
FIG. 4 depicts a set of 14-Track Cells for an inverter function included in an Extended Standard Cell Library, according to embodiments of the present invention.

FIG. 4 depicts a set of 14-Track Cells 400 for an inverter function included in an Extended Standard Cell Library, according to embodiments of the present invention. The set of 14-Track Cells 400 includes existing 14-Track cells $470_A$ (X0), $470_B$ (X2), and $470_C$ (X4). For leakage-power reduction purposes cells, cells $475_A$ through $475_H$ have been added. Cells $475_A$ through $475_D$ are unfolded and have the same area. In cell $475_A$ (X0.4), the transistor sizes, for both P and N transistors (assuming minimum device size m and maximum unfolded device size M) are m+1*(M−m)/5. In cell 475$_B$ (X0.8), the transistor sizes, for both P and N transistors, (assuming minimum device size m and maximum unfolded device size M) are m+2*(M−m)/5. In cell 475$_C$ (X1.2), the transistor sizes, for both P and N transistors, (assuming minimum device size m and maximum unfolded device size M) are m+3*(M−m)/5. In cell 475$_D$ (X1.6), the transistor sizes, for both P and N transistors, (assuming minimum device size m and maximum unfolded device size M) are m+4*(M−m)/5.

Cells 475$_E$ through 475$_H$ have their devices folded like cell 470$_C$. Cells 475$_E$ through 475$_H$ have the same area as cell 470$_C$. In cell 475$_E$ (X2.4), the transistor sizes, for both P and N transistors (assuming minimum device size m and maximum unfolded device size M) are M+1*M/10. In cell 475$_F$ (X2.8), the transistor sizes, for both P and N transistors (assuming minimum device size m and maximum unfolded device size M) are M+2*M/10. In cell 475$_G$ (X3.2), the transistor sizes, for both P and N transistors (assuming minimum device size m and maximum unfolded device size M) are M+3*M/10. In cell 475$_H$ (X3.6), the transistor sizes, for both P and N transistors (assuming minimum device size m and maximum unfolded device size M) are M+4*M/10.

Figure 5:
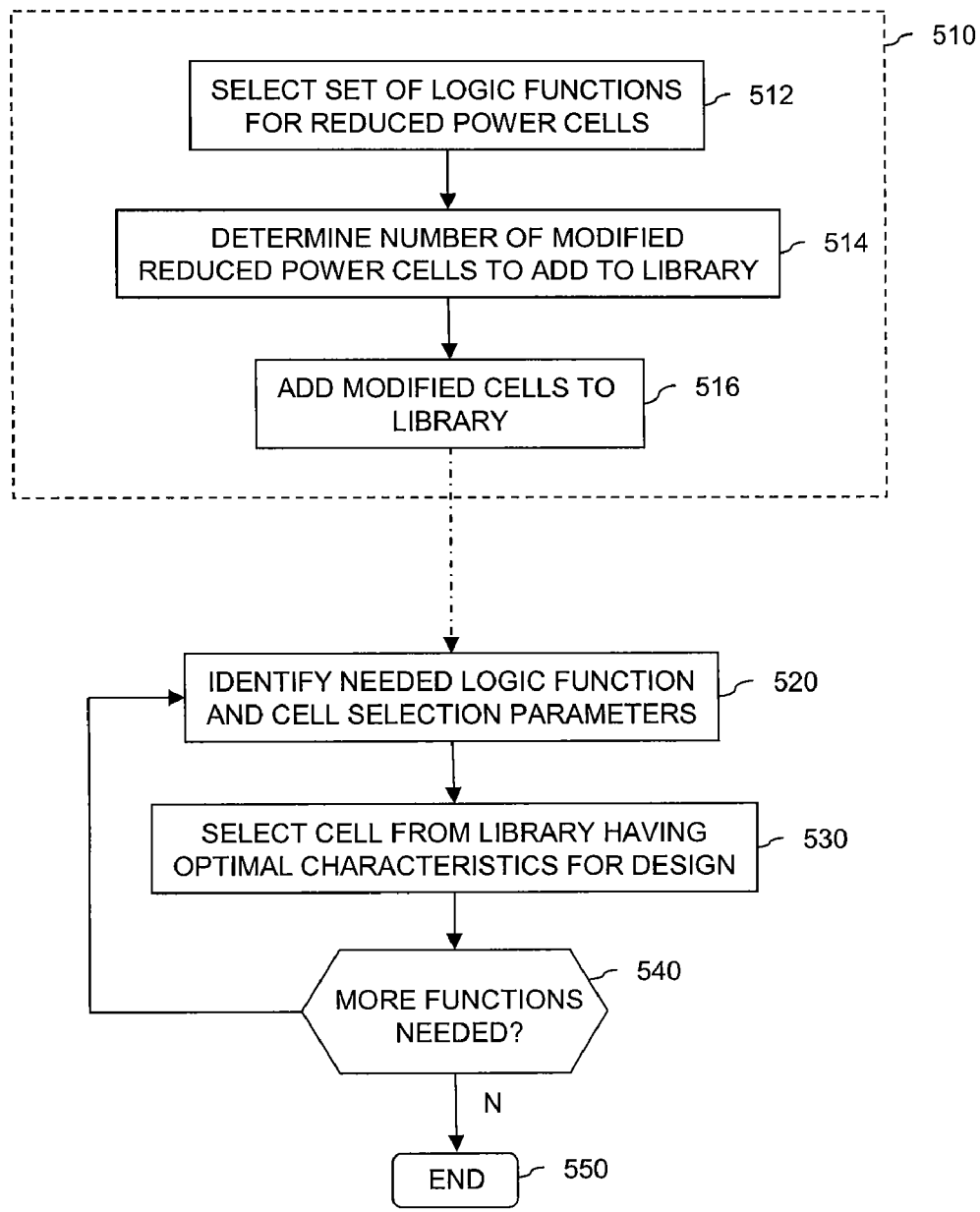
FIG. 5 depicts an exemplary flowchart of a method of utilizing an Extended Standard Cell Library during the design of an integrated circuit, according to embodiments of the present invention.

FIG. 5 depicts an exemplary flowchart 500 of a method of utilizing an Extended Standard Cell Library 150 during the design of an integrated circuit, according to embodiments of the present invention. Flowchart 500 is described with continued reference to the embodiments of FIGS. 1 and 3. However, flowchart 500 is not limited to those embodiments.

In step 510, Extended Standard Cell Library 150 is provided to one or more integrated circuit design tools. Step 510 includes steps 512 through 516.

In step 512, a set of logic functions is selected for design of modified, reduced power cells (e.g., cells 375$_{A-N}$) for addition to an existing X-Track Standard Cell Library. As described above, a design tool may not be able to efficiently use a cell library that provides too many cells and/or too many selections for a specific logic function or set of logic functions. Therefore, only the most commonly used logic functions may be added to the library. However, if a design tool can effectively handle large cell libraries, all or a majority of the logic functions may be selected.

In step 514, the number of modified reduced power cells to add for each logic function is determined. For example, for each of the selected logic functions, a range of cells, each having different characteristics, are designed for Extended Standard Cell Library 150. The number of cells to be added for each logic function may be determined based on the constraints of the design tools, the type of logic function, and/or the needs of an application.

In step 516, the modified, reduced power cells are added to the existing Standard Cell Library to generate Extended Standard Cell Library 150. A modified, reduced power cell is formed by setting the device area of the cell to achieve the desired speed and leakage power for the cell. The device area, and proportionately the padding in the cell, is varied for each cell in the set of modified, reduced power cells for a specific logic function. Accordingly, each modified, reduced power cell for a specific logic function has different speed and leakage power characteristics.

Design tools, such as synthesis tools 120, utilize Extended Cell Library 150 during the design of an integrated circuit. Exemplary high level synthesis steps are described in steps 520 through 540.

In step 520, synthesis tool 120 identifies a logic function and associated cell selection parameters for the integrated circuit being synthesized. For example, synthesis tool 120 may determine that an inverter function is required at this point in the design. The synthesis tool then for example determines how much timing margin and/or power margin exists for the identified logic function.

In step 530, a cell implementing the identified logic function is selected based on the characteristics of the available cells for that logic function and the selection parameters of the design. For example, the synthesis tool will select a cell having the optimal speed and power reduction characteristics given its current selection parameters.

In step 540, a determination is made whether additional logic functions are required in the design. If additional logic functions are required, operation returns to step 520. If no additional logic functions are required, operation proceeds to step 550 and design processing ends.

For example, a design may require multiple instances of the same logic function. The selection characteristics may differ each time a logic function is required by the design tool. Therefore, the first instance of a logic function may have a timing margin of X. However, the second instance of the same logic function may have a significantly shorter timing margin. The optimal cell for the first instance is likely not optimal for the second instance.

If only the existing X-Track cells are offered for a logic function, the synthesis tool will be forced to use potentially larger device sizes and as a consequence increase leakage-power, which is proportional to the first order with device (transistor) sizes. The use of Extended Standard Cell Library 150 mitigates this problem by introducing modified, reduced power library cells that, while the same area as certain counter-parts in the existing library, have smaller device sizes. The existence of these modified, reduced power cells allows the synthesis tool to optimize the leakage-power, and speed, of the design.

Figure 6:
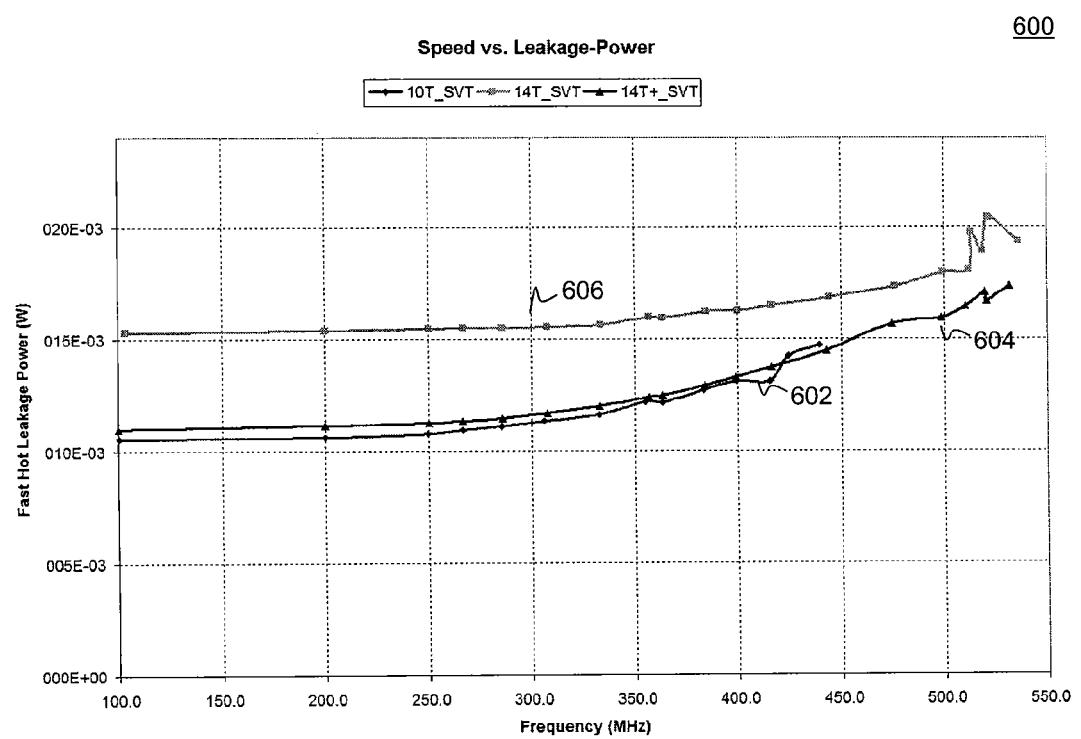
FIG. 6 depicts a graph of the resulting leakage power reduction using an exemplary enhanced 14-Track Standard Cell Library, according to embodiments of the present invention.

FIG. 6 depicts a graph 600 of the resulting leakage power reduction using an exemplary extend 14-Track Standard Cell Library, according to embodiments of the present invention. When modified 14-Track cells, such as described above, are added to the existing cells of a 14-track library, leakage-power is significantly reduced. In FIG. 6, the x-axis represents the circuit speed in frequency and measured in MHz, while the y-axis shows the leakage-power in Watts. Curve 602 shows synthesis results using the base-line smaller N-Track (10-track) library. Curve 604 shows synthesis results using a taller existing X-Track (14-track) library. As illustrated in FIG. 6, the 10-track library has significantly lower leakage than the 14-track library at any frequency point that the 10-track can achieve. However, the 10-Track library can only achieve speeds less than 450 Mhz.

As illustrated in FIG. 6, the 14-track library can achieve significantly higher speeds than the 10-track library. Curve 606 represents the extended 14-track library having modified N-Track, leakage-power reducing cells. For low speeds under about 400 MHz, the curve 606 and the curve 602 are close to each other. At speeds over 400 MHz, the curve 606 drops under curve 602 and it extends much further, to the point of meeting the frequency of the 14-track library. The extended 14-track library is therefore of practical importance for speeds that cannot be met by the 10-track library; in this case above 450 MHz. In that region the extended 14-track library provides the speeds of the original 14-track library with reduced leakage-power. Thus, the extended X-Track Standard Cell Library mitigates leakage-power in high-speed libraries and provides enhanced flexibility to integrated circuit tools.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A resulting integrated circuit designed using an extended standard cell library, wherein the extended cell library has a predefined track height, comprising:
   a first plurality of cells in the resulting integrated circuit having a first device area, wherein the first device area is based on the predefined track height of the extended standard cell library; and
   a second plurality of cells in the resulting integrated circuit having a second device area, wherein the second device area is based on a predefined track height of a second standard cell library, wherein the predefined track height of the second standard cell library is less than the predefined track height of the extended standard cell library,
   wherein each cell in the second plurality of cells includes padding between a voltage rail of the cell and a cell device.

2. The integrated circuit of claim 1, wherein a drive strength of cells in the first plurality of cells is higher than a drive strength of cells in the second plurality of cells.

3. The integrated circuit of claim 2, wherein a leakage power of cells in the first plurality of cells is greater than a leakage power of cells in the second plurality of cells.

4. The integrated circuit of claim 1, further comprising:
   a third plurality of cells having device areas in a range between the device area of the first plurality of cells and the device area of the second plurality of cells.

5. The integrated circuit of claim 1, wherein the first plurality of cells includes a first set of logic functions.

6. The integrated circuit of claim 5, wherein the second plurality of cells includes a second set of logic functions.

7. The integrated circuit of claim 6, wherein the second set of logic functions is a subset of the first set of logic functions.

8. A resulting integrated circuit designed using an extended standard cell library, wherein the extended cell library has a predefined track height, comprising:
   a set of cells in the resulting integrated circuit that are associated with a logic function, wherein the set of cells includes:
      a first cell having a maximum drive strength for the logic function in the extended standard cell library,
      a second cell having a minimum leakage power, wherein the minimum leakage power is determined by a minimum device area required for the logic function, and
      a plurality of third cells having a drive strength between the maximum drive strength for the logic function and a drive strength of the second cell and a leakage power between the minimum leakage power and a leakage power of the first cell,
      wherein the second cell includes padding between a voltage rail of the second cell and a cell device.

9. The integrated circuit of claim 8, wherein the predefined track height is 14-Track.

10. The integrated circuit of claim 9, wherein the leakage power of cells in the extended cell library is equivalent to the leakage power of cells in a smaller track library.

11. The integrated circuit of claim 9, wherein each cell in the plurality of third cells includes padding between a voltage rail of the third cell and a cell device and wherein each cell in the plurality of third cells includes a different amount of padding.

12. The integrated circuit of claim 8, wherein the first cell is a stretched version of a cell in a standard cell library having a second predefined track height, wherein the second predefined track height is less than the predefined track height of the extended standard cell library.

13. The integrated circuit of claim 8, wherein the second cell has leakage power characteristics comparable to a cell in a standard cell library having a second predefined track height, wherein the second predefined track height is less than the predefined track height of the extended standard cell library.

14. A method for forming a resulting integrated circuit using an extended standard cell library, wherein the extended standard cell library has a predefined track height, comprising:
   forming at least one cell in the resulting integrated circuit from a first plurality of cells associated with a first set of logic functions, wherein each cell in the first plurality of cells has a first device area based on a maximum device area for the predefined track height of the extended cell library;
   identifying a second set of logic functions; and
   forming at least one cell in the resulting integrated circuit from a second plurality of cells associated with a second set of logic functions, wherein, for each cell in the second plurality of cell, forming includes:
   placing padding in the cell between a device in the cell and a power rail of the cell to achieve a set of desired characteristics for the cell,
   wherein each cell in the second plurality of cells has different characteristics.

15. The method of claim 14, wherein placing padding in the cell includes:
   determining an amount of padding required to achieve the set of desired characteristics for the cell;
   adding the determined amount of padding to the cell between the device in the cell and the power rail of the cell.

16. The method of claim 15, wherein determining the amount of padding includes:
   determining the amount of padding required to achieve predefined speed and leakage power characteristics for the cell.

17. The method of claim 16, wherein the leakage power characteristics for the cell are comparable to leakage power characteristics of a cell in a standard cell library having a second predefined track height, wherein the second predefined track height is smaller than the predefined track height of the extended standard cell library.

18. The method of claim 14, wherein the second set of logic functions is a subset of the first set of logic functions.

* * * * *